Dec. 2, 1958           R. CASE, JR           2,862,990
COMBINATION POINT AND SPAN TRANSPOSITION BRACKET
Filed Aug. 10, 1955
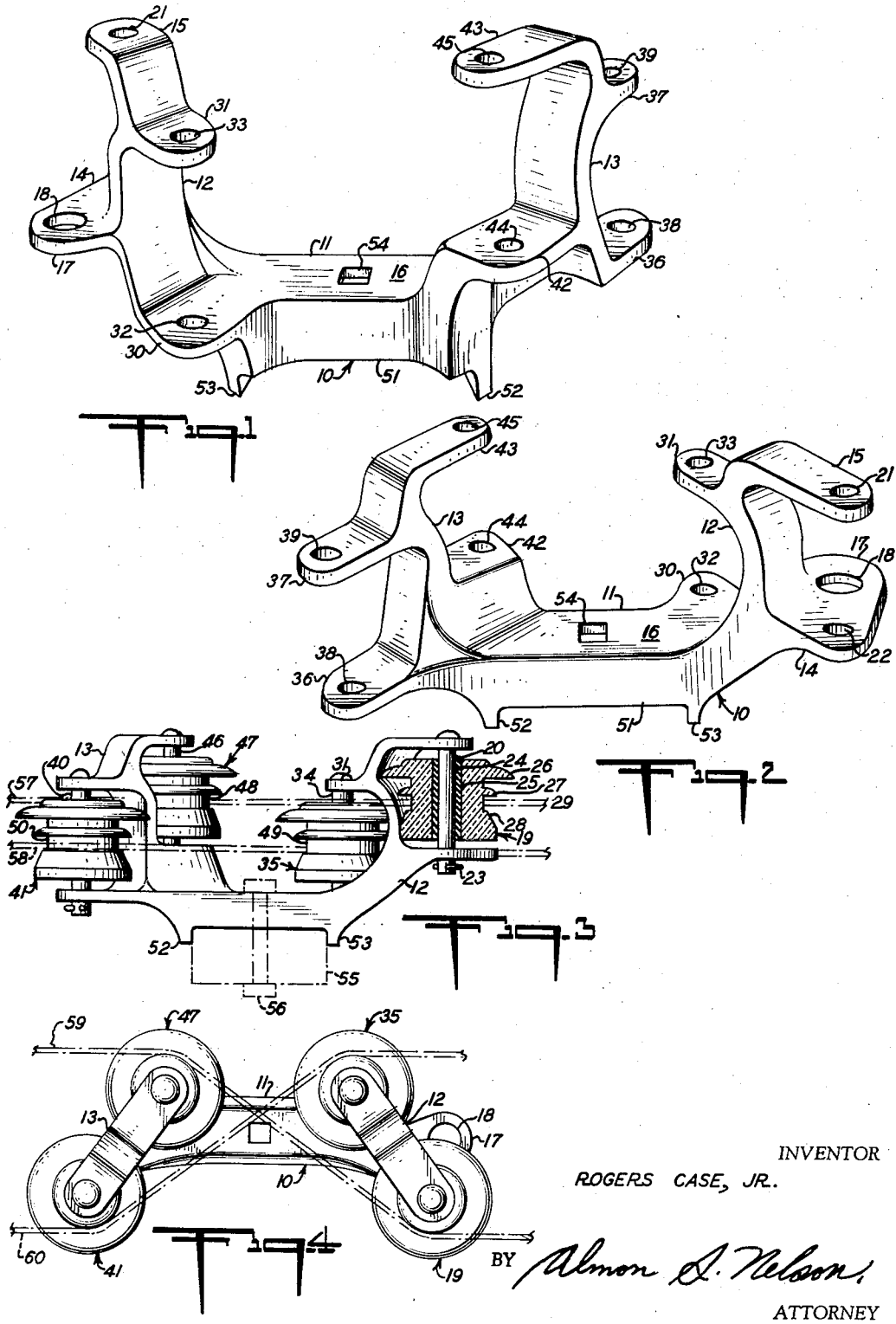
INVENTOR
ROGERS CASE, JR.
BY Almon A. Nelson
ATTORNEY

United States Patent Office 2,862,990
Patented Dec. 2, 1958

2,862,990

**COMBINATION POINT AND SPAN TRANS-
POSITION BRACKET**

Rogers Case, Jr., Orange, N. J.

Application August 10, 1955, Serial No. 527,552

9 Claims. (Cl. 174—33)

This invention relates to the transmission of electrical energy and more particularly to a combination point and span transposition bracket which may be utilized in connection with parallel paired wires to reverse their positions relative to each other at spaced intervals and which may be applied either to the cross arm of a line pole, or at any other desired location between supports for the line wires.

In certain types of electrical energy transmission and particularly in the case of telephone transmission wires utilized for simultaneously transmitting multiple messages, it has been found necessary to transpose or cross the paired transmission wires at uniform distances and for this purpose, various types of transposition brackets have been developed, particularly for mounting on the cross arms of line poles, in order to accomplish the transposition of the line wires at this point. It has been found, however, that the use of such cross arm mounted brackets is not too successful, in that, it is often inconvenient to space line poles equal distances apart and consequently, the transposition points have varied considerably in spacing thereby causing inferior results. It has been attempted to overcome this difficulty by providing transposition brackets which could be inserted between the conductors at any desired point between the line poles and these have been successful, insofar as maintaining uniform spacing of the transposition points, but these prior brackets have been relatively heavy and difficult to use and have often resulted in excessive sag in the line wires between the line poles which introduces other transmission difficulties. Furthermore, it is highly desirable, when possible, to have the transposition point at a line pole and consequently, if some transposition points are to be at the line poles and others between such poles, two types of brackets have, heretofore, been necessary.

It is accordingly an object of this invention to provide a combination point and span transposition bracket which may be utilized for properly transposing parallel electrical line wires, either at the cross arm of a line pole, or at any desired point between the line poles or other supports for the line wires.

A further object of the invention is the provision of a combination point and span transposition bracket which may be conveniently mounted on the line wires adjacent a supporting pole or other structure and thereafter, conveniently positioned at any desired point between the line wire supports.

A still further object of the invention is the provision of a combination point and span transposition bracket which may be of sufficiently lightweight to prevent objectionable sag in the line wires, even though such bracket may be disposed substantially midway between supports for the line wires.

Another object of the invention is the provision of a combination point and span transposition bracket which may be conveniently and economically manufactured as a one-piece integral casting or stamping and which may be utilized for transposing parallel line wires at any desired point between supports for such line wires, or which may be utilized without modification for mounting on the cross arm of a line pole to transpose such line wires at this point.

Another object of the invention is the provision of a combination point and span transposition bracket which may be of sufficiently lightweight to be utilized between the supporting points of a pair of line wires and which, at the same time, may be provided with sufficient structural strength to withstand all strains encountered during both the installation of the transposition bracket and also, strains caused by wind and the like.

In order to provide required transpositions or change in relative position of two adjacent line wires, usually referred to as a carrier pair, such carrier pair being mounted on a series of poles to provide a multiplicity of circuits or channels for the simultaneous transmission of either telegraph characters, hieroglyphics, symbols, etc., and/or telephone conversations, there has been employed transposition brackets which are represented by two principal types.

In one type the fixture is known as a "cross-arm" bracket, and this type of bracket is designed for mounting on the cross-arm attached to the pole as demonstrated by the bracket illustrated in Case Patent No. 2,455,229 and the subsequent improvement patent to Case, No. 2,655,553.

In the other type the fixture is designed to provide a transposition point in any location in the span between poles and is constructed and arranged so that the pressure of the line wires against the insulators on the bracket holds the bracket in a fixed position at the desired point in the span. This bracket is known as a "span" bracket, as illustrated in Case Patent No. 2,455,228 and also in the subsequent improvement patent to Case, No. 2,655,553.

These two types of brackets are not interchangeable and on any project where the transposing of the line wires must be made at specific points, not always at the pole support, it has been found necessary to have both types of brackets available on the job in order to provide for maximum efficiency of operation of the carrier pair. It will be apparent, therefore, that heretofore it has been necessary to carry two types of brackets in the field.

The invention herein relates to a single "all-purpose" transposition bracket, designed in such a way that it can be permanently mounted on a fixed support such as a cross-arm or installed in the line wires between the poles and held rigidly and securely in position by virtue of the pressure of the wires against the insulator components of the bracket.

This dual feature is extremely important in the construction of so-called carrier communication pairs in that the transposing of the line wires can always be made at the exact point in the line wires to insure maximum efficiency of the multiplicity of telegraph or telephone channels for which the carrier pair is designed.

Thus it will be seen that the design of a combination bracket to serve the dual purpose of transposing communication line wires, either at a cross arm or at any point in the span, requires a complicated and unique design to withstand the multiplicity of mechanical forces which come into play in both types of service.

First of all, the bracket must be of such design that it can be rigidly held on a cross-arm without undergoing any distortion whatsoever resulting from the crossloads of the transposed wires in combination with the forces at the fixed support for the bracket. The bracket must also have rigid arms, suitably reinforced to withstand the mechanical forces which are components of, and vary with, the line wire tensions that come into play by reason of the pressure of the transposed wires against the insulators when the bracket is used as a self-supporting member lodged in the wires between the pole supports. The bracket must also be sufficiently light in weight so as not to effect the line wire sags. It is quite important that the insulators required as supports for the line wires be of the spool or roller type similar to those referred to in the previous Case patents so as to facilitate installation of the bracket in the span without undue straining of the line wire.

Many different types of brackets were considered before the final design herein was developed. Extensive tests on this design of bracket have definitely indicated that the component parts of the bracket have the desired rigidity in all directions, whether the bracket is used in a fixed position on a cross-arm or whether it is lodged in the wires in the span. Loads equivalent to the breaking strength of the line wires were applied to the bracket without in any way weakening the bracket or causing any permanent distortion in the various component members.

All of such tests indicate that the bracket herein provides the desired efficiency in transposing the communication wires and that it possesses overall adequate rigidity to withstand the mechanical stresses that are encountered even when the line wires are stretched to their breaking point by reason of external loads of ice and wind normally encountered in service. The applicant's bracket, due to its unique design, is so proportioned as to permit the line wires to be spaced closer together than is possible with either the cross-arm type of Case Patent No. 2,455,229 or the span type of Case Patent No. 2,455,228, or the improvement patent of Case, No. 2,655,553. It is believed to be obvious that this universal type of transposition bracket has wide application in the communication field.

Further objects and advantages of the invention will be apparent from the following description taken in conjunction with the accompanying drawing wherein:

Fig. 1 is a view in perspective showing the rear side of the frame constituting the major portion of the transposition bracket of this invention;

Fig. 2, a view in perspective showing the forward side of the frame shown in Fig. 1;

Fig. 3, a side elevational view with parts in section for greater clarity and showing the transposition bracket mounted on the cross arm of a line pole; and Fig. 4, a top plan view of the transposition bracket with conductors trained over the insulators mounted thereon.

With continued reference to the drawing, there is shown a combination point and span transposition bracket constructed in accordance with this invention and which may well comprise an integral one-piece frame 10 which may be conveniently formed as a casting, stamping or in any other desired manner and from a suitable lightweight material, such as an aluminum or magnesium alloy. The frame 10 may include a relatively narrow substantially rectangular elongated central base portion 11 terminating at one end in an upstanding arm 12 and at the opposite end in an upstanding arm 13. As shown in Fig. 2, arms 12 and 13 diverge forwardly of the base portion 11 and arm 12 is provided on the forward side thereof, with a pair of vertically spaced ears 14 and 15 with the lower ear 14 spaced above the upper surface 16 of the base portion 11. The lower ear 14 is provided with an enlargement 17 and an aperture 18 is formed in the enlargement 17 with such aperture substantially in alignment with the longitudinal center line of the base portion 11. The purpose and operation of the aperture 18 will be later described.

An insulator 19 of glass or any other suitable non-conducting material is mounted between the ears 14 and 15 on the arm 12 by means of a pin 20 extending through an aperture 21 in the upper ear 15 and through an aperture 22 in the lower ear 14 with the pin 20 being held against displacement by a cotter key 23 or by any other suitable fastening means. As shown in Fig. 3, the pin 20 extends through a bushing 24 received in a bore 25 in the insulator 19 and the bushing 24 may be of a suitable non-conducting material, such as rubber or the like and serves to cushion the insulator 19 and also to engage a line wire in the event the insulator 19 breaks and thereby prevent a short circuit which would be the case, if the line wire were to contact the metallic pin 20. The insulator 19 is provided with a suitable flange 26 adjacent the upper end thereof to shed rain and is also provided with an intermediate flange 27 which, together with a shoulder 28 is spaced therefrom, provides an annular groove 29 for receiving a line wire, in a manner to be later described.

A pair of vertically spaced ears 30 and 31 are provided on the rear side of the arm 12 and, it is to be noted, that the lower ear 30 is spaced below the lower ear 14 of the pair above described and that the ear 30 is substantially in the same plane as the upper surface of the base portion 11. Ears 30 and 31 are provided with apertures 32 and 33 respectively for receiving a pin 34 for mounting an insulator 35 between the ears 30 and 31 in the same manner as described above, in connection with insulator 19.

The other arm 13 is provided on the forward side thereof, with vertically spaced ears 36 and 37 and the lower side 36 is substantially in the same plane as the lower ear 30 and the upper surface of the base portion 11. Ears 36 and 37 are provided with apertures 38 and 39 respectively, for receiving a pin 40 to secure an insulator 41 between the ears 36 and 37 in the same manner, as above described, in connection with the insulators 19 and 35.

The arm 13 is provided on the rear side thereof with vertically spaced ears 42 and 43 and it is to be noted, that ear 42 is substantially in the same plane as the ear 14 on the arm 12. Ears 42 and 43 are provided with apertures 44 and 45 respectively, for receiving a pin 46 to secure an insulator 47 in place between the ears 42 and 43.

Insulator 47 is provided with an annular line wire receiving groove 48 located in substantially the same plane as the groove 29 in the insulator 19 and insulator 35 is provided with an annular line wire receiving groove 49 which is in substantially the same plane as an annular line wire receiving groove 50 in the insulator 41.

Depending from the lower surface 51 of the base portion 11 of the frame 10 are spaced lugs 52 and 53 and located substantially centrally of the base portion 11 is a fastener receiving aperture 54.

For use as a cross arm point transposition bracket, the frame 10 is mounted on the cross arm 55 of a line supporting pole and is secured thereto by a bolt 56 or other suitable fastening means extending through the cross arm 55 and the aperture 54 in the base portion 11 of the frame 10. The frame 10 is held in fixed location by the lugs 52 and 53 engaging the sides of the cross arm 55. In this use of the device of this invention, a line wire 57 may be trained over the insulator 47 in the annular groove 48 across the base portion 11 above the same and around the insulator 19 in the annular groove 29. A second line wire 58 may be received in the annular groove 50 of the insulator 41 and crosses the base portion 11 below the line wire 57 and is trained around the insulator 35 in the groove 49. Thus, the line wires 57 and 58 are transposed directly over the cross arm 55 and the horizontal and vertical spacing of the line wires 57 and 58 is maintained.

In order to utilize the transposition bracket of this invention as a span point type bracket, at locations between supporting points for the line wires it is only necessary to provide sufficient slack in such line wires whereupon the bracket is usually applied thereto adjacent a supporting line pole by training one line wire 59 over the insulator 47 and over the insulator 19, with a second line wire 60 trained over the insulator 41 and crossing the base portion 11 below the line wire 59 and over the insulator 35. The line wires 59 and 60 are thus effectively transposed and maintained in spaced condition and in order to locate the transposition bracket at the desired location in the line wire span between supporting poles, a suitable cable, not shown, is releasably secured in the aperture 18 and the bracket is pulled to the desired position on the line wires 59 and 60, after which the towing cable or rope is detached from the aperture 18. The bracket will thereafter remain in this location, regardless of strain exerted thereon, or sway in the cables due to wind or other factors.

It will be seen that by the above described invention, there has been provided a relatively simple combination transposition bracket which may be utilized with equal facility, either at any desired location between supporting points of electrical transmission line wires or may be conveniently secured to a cross arm on a supporting line pole with the transposition of the line wires properly maintained. The bracket may be of extremely lightweight material and may be provided with sufficient structural strength to withstand all stresses encountered in this type of service. The bracket of this invention also eliminates the necessity for providing two types of brackets, one type to be utilized on the cross arms of line poles and the other to be utilized at intermediate points between such line poles, thereby facilitating transposition of line wires at equally spaced points.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A combined span and cross arm transposition bracket comprising an integral one-piece frame having a relatively narrow substantially rectangular elongated central base portion terminating at each end in upstanding arms diverging forwardly of said base portion, a pair of vertically spaced ears on the forward side of one arm with the lower ear spaced above said base portion, an insulator disposed between said ears and removably secured thereto, an enlargement on said lower ear, an aperture in said enlargement substantially in alignment with the longitudinal center line of said base portion to facilitate attachment of a towing cable, a second pair of vertically spaced ears on the rear side of the other arm with the lower ear of said second pair in substantially the same plane as the lower ear of said first pair, a second insulator disposed between said second pair of ears and removably secured thereto, a third pair of vertically spaced ears on the rear side of said one arm with the lower ear of said third pair in substantially the same plane as the upper surface of said base portion, a third insulator disposed between said third pair of ears and removably secured thereto, a fourth pair of vertically spaced ears on the forward side of said other arm with the lower ear of said fourth pair in substantially the same plane as the upper surface of said base portion, a fourth insulator disposed between said fourth pair of ears and removably secured thereto whereby a line wire may be trained over said first and second insulators and a second line wire trained over said third and fourth insulators to transpose said line wires and maintain the same in spaced relation, spaced lugs depending from the lower surface of said base portion operable when said bracket is used as a cross arm bracket to engage and partially embrace a support member and a fastener receiving aperture in said base portion to facilitate securing said bracket to said support.

2. A combined span and cross arm transposition bracket comprising a one-piece frame having a relatively narrow elongated central base portion terminating at each end in upstanding arms diverging forwardly of said base portion, a pair of vertically spaced ears on the forward side of one arm with the lower ear spaced above said base portion, an insulator disposed between said ears and removably secured thereto, an enlargement on said lower ear, an aperture in said enlargement substantially in alignment with the longitudinal center line of said base portion to facilitate attachment of a towing cable, a second pair of vertically spaced ears on the rear side of the other arm with the lower ear of said second pair in substantially the same plane as the lower ear of said first pair, a second insulator disposed between said second pair of ears and removably secured thereto, a third pair of vertically spaced ears on the rear side of said one arm with the lower ear of said third pair in substantially the same plane as the upper surface of said base portion, a third insulator disposed between said third pair of ears and removably secured thereto, a fourth pair of vertically spaced ears on the forward side of said other arm with the lower ear of said fourth pair in substantially the same plane as the upper surface of said base portion, a fourth insulator disposed between said fourth pair of ears and removably secured thereto whereby a line wire may be trained over said first and second insulators and a second line wire trained over said third and fourth insulators to transpose said line wires and maintain the same in spaced relation, spaced lugs depending from the lower surface of said base portion operable when said bracket is used as a cross arm bracket to engage and partially embrace a support member and a fastener receiving aperture in said base portion to facilitate securing said bracket to said support.

3. A combined span and cross arm transposition bracket comprising a one-piece frame having a relatively narrow elongated central base portion terminating at each end in upstanding arms diverging forwardly of said base portion, a pair of vertically spaced ears on the forward side of one arm with the lower ear spaced above said base portion, an insulator disposed between said ears and removably secured thereto, an enlargement on said lower ear, an aperture in said enlargement substantially in alignment with the longitudinal center line of said base portion to facilitate attachment of a towing cable, a second pair of vertically spaced ears on the rear side of the other arm with the lower ear of said second pair in substantially the same plane as the lower ear of said first pair, a second insulator disposed between said second pair of ears and removably secured thereto, a third pair of vertically spaced ears on the rear side of said one arm with the lower ear of said third pair in substantially the same plane as the upper surface of said base portion, a third insulator disposed between said third pair of ears and removably secured thereto, a fourth pair of vertically spaced ears on the forward side of said other arm with the lower ear of said fourth pair in substantially the same plane as the upper surface of said base portion, a fourth insulator disposed between said fourth pair of ears and removably secured thereto whereby a line wire may be trained over said first and second insulators and a second line wire trained over said third and fourth insulators to transpose said line wires and maintain the same in spaced relation, means on said base portion operable when said bracket is used as a cross arm bracket to engage and partially embrace a support member and means on said base portion to facilitate securing said bracket to said support.

4. A combined span and cross arm transposition bracket comprising a one-piece frame having a relatively narrow elongated central base portion terminating at each end in upstanding arms diverging forwardly of said base portion, a pair of vertically spaced ears on the forward side of one arm with the lower ear spaced above said base portion, an insulator disposed between said ears and removably secured thereto, an enlargement on said lower ear, an aperture in said enlargement substantially in alignment with the longitudinal center line of said base portion to facilitate attachment of a towing cable, a second pair of vertically spaced ears on the rear side of the other arm with the lower ear of said second pair in substantially the same plane as the lower ear of said first pair, a second insulator disposed between said second pair of ears and removably secured thereto, a third pair of vertically spaced ears on the rear side of said one arm with the lower ear of said third pair in substantially the same plane as the upper surface of said base portion, a third insulator disposed between said third pair of ears and removably secured thereto, a fourth pair of vertically spaced ears on the forward side of said other arm with the lower ear of said fourth pair in substantially the same plane as the upper surface of said base portion, a fourth insulator disposed between said fourth pair of ears and removably secured thereto whereby a line wire may be trained over said first and second insulators and a second line wire trained over said third and fourth insulators to transpose said line wires and maintain the same in spaced relation and means operable when said bracket is used as a cross arm bracket on said base portion to facilitate securing said bracket to a support.

5. A combined span and cross arm transposition bracket comprising a one-piece frame having a central base portion terminating at each end in upstanding arms diverging forwardly of said base portion, a pair of vertically spaced ears on the forward side of one arm with the lower ear spaced above said base portion, an insulator disposed between said ears and removably secured thereto, an enlargement on said lower ear, an aperture in said enlargement substantially in alignment with the longitudinal center line of said base portion to facilitate attachment of a towing cable, a second pair of vertically spaced ears on the rear side of the other arm with the lower ear of said second pair in substantially the same plane as the lower ear of said first pair, a second insulator disposed between said second pair of ears and removably secured thereto, a third pair of vertically spaced ears on the rear side of said one arm with the lower ear of said third pair in substantially the same plane as the upper surface of said base portion, a third insulator disposed between said third pair of ears and removably secured thereto, a fourth pair of vertically spaced ears on the forward side of said other arm with the lower ear of said fourth pair substantially in the same plane as the upper surface of said base portion, a fourth insulator disposed between said fourth pair of ears and removably secured thereto whereby a line wire may be trained over said first and second insulators and a second line wire trained over said third and fourth insulators to transpose said line wires and maintain the same in spaced relation and means operable when said bracket is used as a cross arm bracket on said base portion to facilitate securing said bracket to a support.

6. A combined span and cross arm transposition bracket comprising a one-piece frame having a central base portion terminating at each end in upstanding arms, a pair of vertically spaced ears on the forward side of one arm with the lower ear spaced above said base portion, an insulator disposed between said ears and removably secured thereto, an enlargement on said lower ear, an aperture in said enlargement substantially in alignment with the longitudinal center line of said base portion to facilitate attachment of a towing cable, a second pair of vertically spaced ears on the rear side of the other arm with the lower ear of said second pair in substantially the same plane as the lower ear of said first pair, a second insulator disposed between said second pair of ears and removably secured thereto, a third pair of vertically spaced ears on the rear side of said one arm with the lower ear of said third pair in substantially the same plane as the upper surface of said base portion, a third insulator disposed between said third pair of ears and removably secured thereto, a fourth pair of vertically spaced ears on the forward side of said other arm with the lower ears of said fourth pair in substantially the same plane as the upper surface of said base portion, a fourth insulator disposed between said fourth pair of ears and removably secured thereto whereby a line wire may be trained over said first and second insulators and a second line wire trained over said third and fourth insulators to transpose said line wires and maintain the same in spaced relation and means operable when said bracket is used as a cross arm bracket on said base portion to facilitate securing said bracket to a support.

7. A combined span and cross arm transposition bracket comprising a one-piece frame having a central base portion terminating at each end in upstanding arms, a pair of vertically spaced ears on the forward side of one arm with the lower ear spaced above said base portion, an insulator disposed between said ears and removably secured thereto, means on said one arm substantially in alignment with the longitudinal center line of said base portion to facilitate attachment of a towing cable, a second pair of vertically spaced ears on the rear side of the other arm with the lower ear of said second pair in substantially the same plane as the lower ear of said first pair, a second insulator disposed between said second pair of ears and removably secured thereto, a third pair of vertically spaced ears on the rear side of said one arm with the lower ear of said third pair in substantially the same plane as the upper surface of said base portion, a third insulator disposed between said third pair of ears and removably secured thereto, a fourth pair of vertically spaced ears on the forward side of said other arm with the lower ear of said fourth pair in substantially the same plane as the upper surface of said base portion, a fourth insulator disposed between said fourth pair of ears and removably secured thereto whereby a line wire may be trained over said first and second insulators and a second line wire trained over said third and fourth insulators to transpose said line wires and maintain the same in spaced relation and means operable when said bracket is used as a cross arm bracket on said base portion to facilitate securing said bracket to a support.

8. A combined span and cross arm transposition bracket comprising a one-piece frame having a central base portion terminating at each end in upstanding arms, a pair of vertically spaced ears on the forward side of one arm with the lower ear of said pair spaced above said base portion, an insulator disposed between said ears and removably secured thereto, a second pair of vertically spaced ears on the rear side of the other arm with the lower ear of said second pair in substantially the same plane as the lower ear of said first pair, a second insulator disposed between said second pair of ears and removably secured thereto, a third pair of vertically spaced ears on the rear side of said one arm with the lower ear of said third pair spaced below the lower ear of said first pair, a third insulator disposed between said third pair of ears and removably secured thereto, a fourth pair of vertically spaced ears on the forward side of said other arm with the lower ear of said fourth pair in substantially the same plane as the lower ear of said third pair, a fourth insulator disposed between said fourth pair of ears and removably secured thereto whereby a line wire may be trained over said first and second insulators and a second line wire trained over said third and fourth insulators to transpose said line wires and maintain the same in spaced relation.

9. A combined span and cross arm transposition bracket comprising a frame having a central base portion terminating at each end in upstanding arms, a pair of vertically spaced ears on the forward side of one arm with the lower ears spaced above said base portion, an insulator disposed between said ears and secured thereto, a second pair of vertically spaced ears on the rear side of the other arm with the lower ear of said second pair in substantially the same plane as the lower ear of said first pair, a second insulator disposed between said second pair of ears and secured thereto, a third pair of vertically spaced ears on the rear side of said one arm with the lower ear of said third pair spaced below the lower ear of said first pair, a third insulator disposed between said third pair of ears and secured thereto, a fourth pair of vertically spaced ears on the forward side of said other arm with the lower ear of said fourth pair in substantially the same plane as the lower ear of said third pair, a fourth insulator disposed between said fourth pair of ears and secured thereto whereby a line wire may be traineed over said first and second insulators and a second line wire trained over said third and fourth insulators to transpose said line wires and maintain the same in spaced relation.

References Cited in the file of this patent

UNITED STATES PATENTS

| | | |
|---|---|---|
| Re. 19,473 | Rick | Feb. 19, 1935 |
| 2,655,553 | Case | Oct. 13, 1953 |

OTHER REFERENCES

Publication I: "Line Construction Blueprints," published in Railway Signalling, April 1953 (page 119 relied on). (Copy in Scientific Library and in 174-33.)